(12) United States Patent
Lynn et al.

(10) Patent No.: US 11,091,079 B1
(45) Date of Patent: *Aug. 17, 2021

(54) REMOVABLE GRAB HANDLE ASSEMBLY FOR A VEHICLE

(71) Applicant: Atomic Monkey Industries Inc., San Clemente, CA (US)

(72) Inventors: James R. Lynn, San Clemente, CA (US); Michael Lynn, Mission Viejo, CA (US)

(73) Assignee: Atomic Monkey Industries Inc, Whitefish, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/505,277

(22) Filed: Jul. 8, 2019

Related U.S. Application Data

(63) Continuation of application No. 15/626,062, filed on Jun. 16, 2017, now Pat. No. 10,343,575.

(60) Provisional application No. 62/351,502, filed on Jun. 17, 2016.

(51) Int. Cl.
| | |
|---|---|
| *B60N 3/02* | (2006.01) |
| *B60R 11/06* | (2006.01) |
| *B60R 7/04* | (2006.01) |
| *B60R 11/00* | (2006.01) |

(52) U.S. Cl.
CPC ............. *B60N 3/023* (2013.01); *B60N 3/026* (2013.01); *B60R 7/04* (2013.01); *B60R 11/06* (2013.01); *B60R 2011/0003* (2013.01); *B60R 2011/0057* (2013.01); *B60R 2011/0063* (2013.01)

(58) Field of Classification Search
CPC ......... B60N 3/023; B60N 3/026; B60R 11/06; B60R 2011/0003; B60R 2011/0057; B60R 2011/0063
See application file for complete search history.

(56) References Cited

U.S. PATENT DOCUMENTS

| | | | | |
|---|---|---|---|---|
| 5,611,590 | A * | 3/1997 | Filgueiras | B60J 3/0208 |
| | | | | 296/97.1 |
| 5,867,868 | A * | 2/1999 | Ward | A63B 49/08 |
| | | | | 16/422 |
| 6,360,402 | B1 * | 3/2002 | Crabtree | A45C 13/00 |
| | | | | 16/422 |
| 9,205,724 | B2 * | 12/2015 | Marcus | B60J 3/0213 |
| 10,343,575 | B1 | 7/2019 | Lynn et al. | |
| 2007/0235484 | A1 * | 10/2007 | Staniszewski | B60R 7/05 |
| | | | | 224/312 |
| 2018/0147981 | A1 * | 5/2018 | Troeger | B60N 3/02 |

* cited by examiner

*Primary Examiner* — Corey N Skurdal
(74) *Attorney, Agent, or Firm* — Knobbe, Martens, Olson & Bear, LLP

(57) ABSTRACT

According to some embodiments, an assembly configured to be removably secured to an exposed structural component of a vehicle (e.g., a rollbar) comprises a cover assembly configured to secure to the exposed structural component of the vehicle, a hand grip configured to pass through at least a portion of the cover assembly and hand below the cover assembly, wherein the hand grip is configured to be grasped by a user, and at least one tool-receiving member configured to secure to the cover assembly.

3 Claims, 6 Drawing Sheets

REMOVABLE GRAB HANDLE ASSEMBLY FOR A VEHICLE

RELATED APPLICATIONS

This application is a continuation of U.S. patent application Ser. No. 15/626,062 filed Jun. 16, 2017, which claims priority to U.S. Provisional Patent Application No. 62/351,502, filed Jun. 17, 2016. The entireties of both of the foregoing priority applications are hereby incorporated by reference herein.

BACKGROUND

Field

This application relates generally to accessories for vehicles, and more specifically, to accessories for vehicles with exposed, factory-installed and/or aftermarket exposed internal cage structures and various tools, devices, systems and methods related thereto.

Description of the Related Art

Certain vehicles, especially offroad-style vehicles, have hand grips to ensure safe entry and exit and to provide a grasping portion for the driver and/or other occupants while driving. A need exists for improved hand grip assembly designs that provide additional benefits and advantages to users.

SUMMARY

According to some embodiments, an assembly configured to be removably secured to an exposed structural component of a vehicle (e.g., a rollbar, roll cage, etc.) comprises a cover assembly configured to secure to the exposed structural component of the vehicle, a hand grip configured to pass through at least a portion of the cover assembly and hand below the cover assembly, wherein the hand grip is configured to be grasped by a user, and at least one tool-receiving member configured to secure to the cover assembly.

According to some embodiments, the cover assembly comprises a hook and loop portion for securing to the exposed structural component of the vehicle. In some embodiments, the at least one tool-receiving member comprises a pouch, a recess, a slot and/or any other stowage or storage device or member.

According to some embodiments, the at least one tool-receiving member is removably secured to the cover assembly. In some embodiments, the at least one tool-receiving member is secured to the cover assembly using a hook and loop system, at least one button and/or other fastener and/or the like.

According to some embodiments, a system is configured to incorporate a releasably attached grab handle and an integrated cover system for one or more tools or implements which releasably attaches to the roll bar of a vehicle.

According to some embodiments, a system comprises a releasably attached grab handle that passes through an integrated cover surface, a releasably attached main cover and stowage surface that generally covers an area of the exposed vehicle component that is adjacent to and within reach of an occupant of the vehicle, wherein the main cover comprises at least one opening through which the grab handle passes.

According to some embodiments, a system comprises a releasably attached roll cage cover which incorporates one or more of the following: a provision for incorporating a grab handle that passes through the cover surface, at least one integrated stowage pouch, with or without a cover, at least one hook and loop field for securing releasably attached patches, or placards, and an integrated pouch for stowage of a knife, flashlight, e-tool, multitool, or other similar-sized implement.

According to some embodiments, a system configured to secure to a component of a vehicle comprises a removable grab handle configured to secure to a component of a vehicle, and a cover configured to be positioned at least partially around the grab handle, the cover comprising at least one opening, wherein the grab handle is configured to pass through the at least one opening of the cover, wherein the grab handle and the cover, and thus the system, is configured to be selectively removed and attached to the component of the vehicle in one or a plurality of locations, wherein the cover comprises at least one attachment surface, the at least one attachment surface configured to removably or permanently secure at least one attachment member.

According to some embodiments, the at least one opening of the cover comprises two openings. In other embodiments, the cover comprises one, two, three, four, more than four openings. In some embodiments, the grab handle is configured to secure to the component of the vehicle using a hook and loop system.

According to some embodiments, the cover is configured to secure to the component of the vehicle and around the grab handle using a hook and loop system. In some embodiments, the component of the vehicle comprises a rollbar, a portion of a roll cage and/or any other structural or non-structural component or portion of the vehicle.

According to some embodiments, the at least one attachment surface of the cover comprises at least one of a hook and a loop surface of a hook and loop system. In some embodiments, the at least one attachment surface of the cover comprises a magnetic surface or component to which corresponding members can be removable secured. In some embodiments, the attachment member configured to secure to the at least one attachment surface comprises one or more of the following: a pouch, an elastic band, another band or field, another stowage or storage member, an identification badge and the like.

BRIEF DESCRIPTION OF THE DRAWINGS

These and other features, aspects and advantages of the present application are described with reference to drawings of certain embodiments, which are intended to illustrate, but not to limit, the various inventions disclosed herein. It is to be understood that the attached drawings are for the purpose of illustrating concepts and embodiments of the present application and may not be to scale.

DETAILED DESCRIPTION

Certain motor vehicles are equipped with exposed internal cages and other exposed structures, such as roll bars, roll cages and the like, for the protection of the occupant(s) in a roll-over scenario and/or for one or more other purposes or reasons. Such exposed roll bar and cages are most prevalent in offroad-style vehicles, such as, for example, certain Jeep models. These vehicles are often fitted with factory, or aftermarket accessories, such as larger tires, lift kits, etc., which necessitate a grab handle to assist in entry into the vehicle. In some embodiments, a grab handle may also be used as a stabilizer for the occupants while traveling on uneven or rocky trails.

Additionally, certain tools and implements can provide benefits and assistance during some on, and off-highway driving conditions. Examples include, for example, flashlights, emergency extract, egress tools (e-tools), multitools and/or other implements. Several embodiments exist for stowage or storage of individual tools and implements, and some embodiments exist that may be modified to releasably attach to the roll cage of the vehicle. However, existing embodiments of such tools are typically singular in their function, and do not address a system that specifically includes the incorporation of an integrated grab handle, and a method for storage or stowage of tools and implements.

Several embodiments described herein include systems that provide a releasably attached grab handle, combined with an integrated cover that may provide one or more additional benefits, such as, for example, providing padding to the roll cage, protecting the releasable grab handle attachments from the elements and/or the like.

Further, in some embodiments, the various systems, devices and implements disclosed herein are designed to provide improved access and secure stowage of tools and implements that a driver and/or other occupant of the vehicle may desire to have within a safe reach, while seat-belted inside the vehicle (e.g., for safety reasons).

Figure 1:
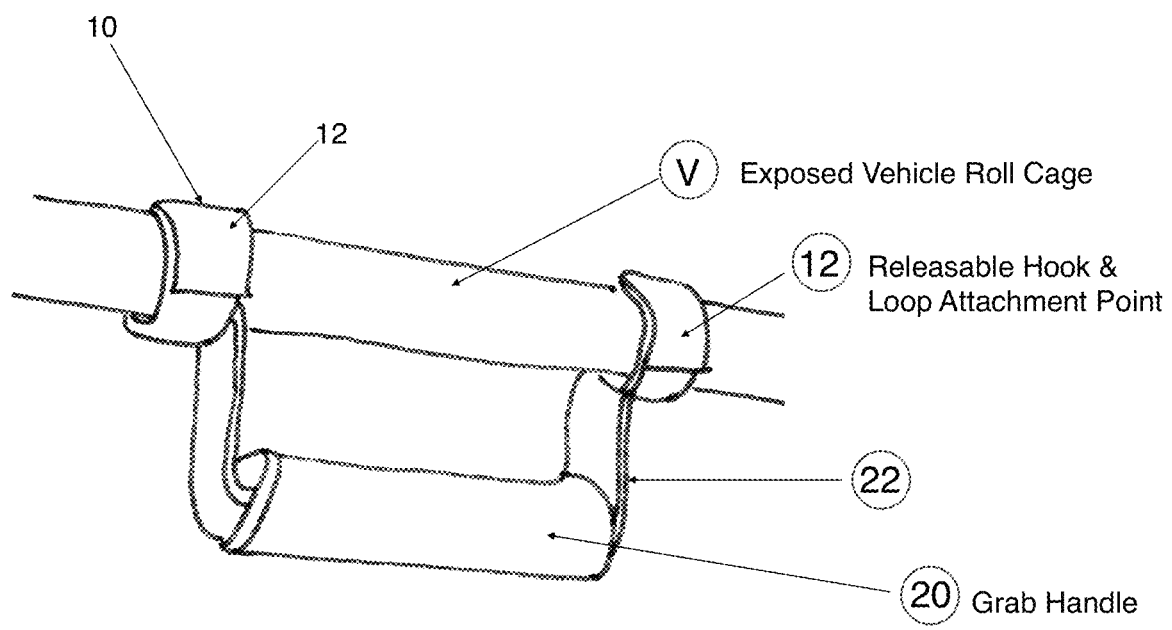
FIG. 1 schematically illustrates a perspective view of a grab handle assembly according to one embodiment.

FIG. 1 illustrates one embodiment of a grab handle assembly 10 configured for releasable attachment to a rollbar, a roll cage or other exposed structure V of a vehicle. As shown, the handle assembly 10 includes a grab handle 20 that is sized, shaped and otherwise configured to be reached and grasped by an occupant of a vehicle. The handle 20 can include one or more flexible, rigid and/or semi-rigid materials, as desired or required. For example and without limitation, the handle 20 can comprise one or more of the following: leather, fabric, plastic, rubber, metals, alloys, other synthetic and/or natural materials and/or the like.

With continued reference to FIG. 1, the handle 20 can be secured to the rollbar or other structure V of the vehicle using one or more connections. For example, in the illustrated configuration, the grab handle 20 is secured to a rollbar V using two connectors 12. In some embodiments, as shown in FIG. 1, the connectors 12 are secured to the grab handle 20 using separate vertical members 22. However, in other embodiments, the grab handle 20 is secured directly to the connectors 12 (e.g., secured without the need for separate members or portions 22), as desired or required.

As shown in FIG. 1, the grab handle assembly 10 can include connectors 12 that comprise one or more components, features and/or other configurations that are designed to secure the assembly 10 to the rollbar or other vehicle structure V. For example, in some embodiments, the connectors 12 comprise hook and loop connectors that are configured to fully (or at least partially) wrap around the rollbar or other vehicle structure V. In some configurations, such hook and loop features include corresponding portions that are configured to secure to themselves (e.g., at least partially) in order to releasably secure the connector to the vehicle. In other embodiments, one or more other types of connectors can be used to secure the assembly 10 to the rollbar or other portion of a vehicle, such as, for example, buttons, snaps, zippers, other mechanical fasteners, laces, cords, adhesive strips, adhesives and/or the like, either in lieu of or in addition to hook and loop connectors, as desired or required.

Figure 2:
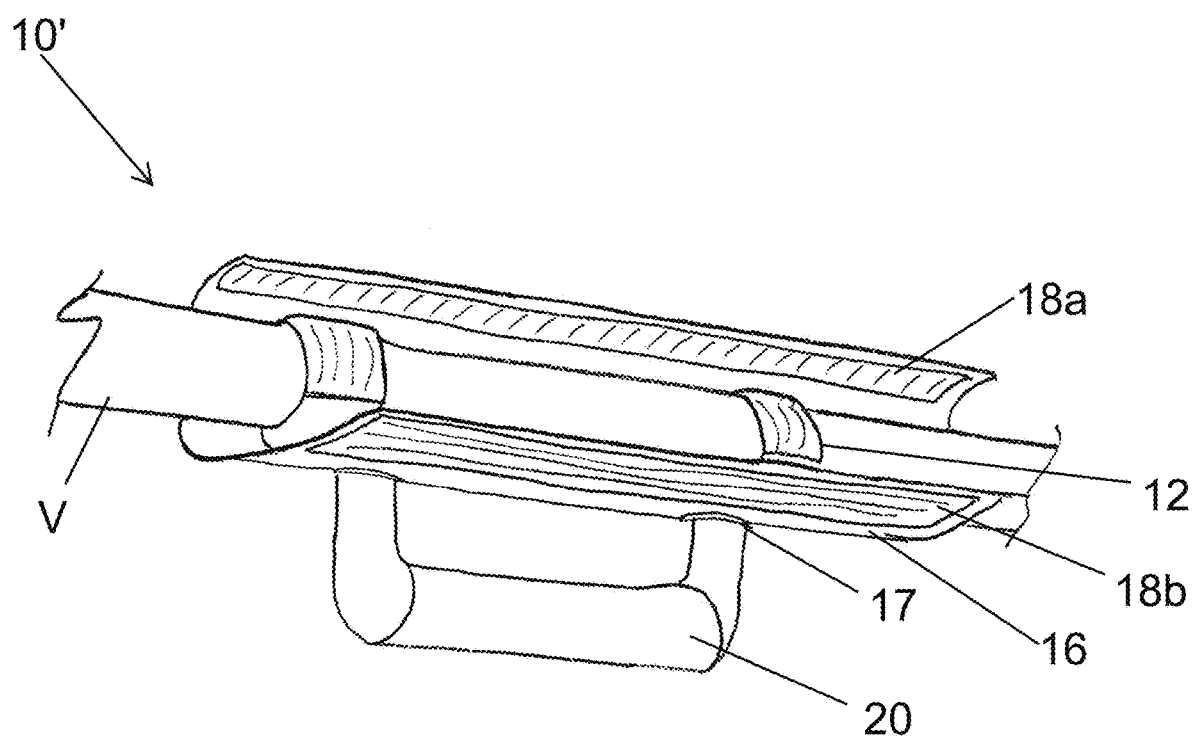
FIG. 2 schematically illustrates a perspective view of a grab handle assembly according to another embodiment.

FIG. 2 schematically illustrates another embodiment of a grab handle assembly 10' that is configured to be removably secured to a rollbar or other internal structure V of a vehicle. The depicted assembly 10' is similar to the one described above with reference to FIG. 1. However, the grab handle assembly 10' of FIG. 2 additionally includes a utility cover assembly 16. In other arrangements, however, a cover assembly 16 is not required at all or the assembly can be used without the cover assembly 16 (e.g., even if one is provided).

With continued reference to FIG. 2, the utility cover assembly 16 can also include one or more attachment members, portions and/or features, such as, for example, hook and loop members 18a, 18b, buttons, other fasteners and/or the like. In some embodiments, the cover assembly 16 comprises openings 17 through which the grab handle 20 may pass.

The various embodiments disclosed herein permit a grab handle assembly to be selectively secured to and removed from a rollbar or other internal or external structure of a vehicle (e.g., component or portion of a roll cage, other structural or non-structural member, etc.). In some embodiments, the grab handle assembly can be repositioned according to the desired configuration of the driver or other occupant of the vehicle.

Figure 3:
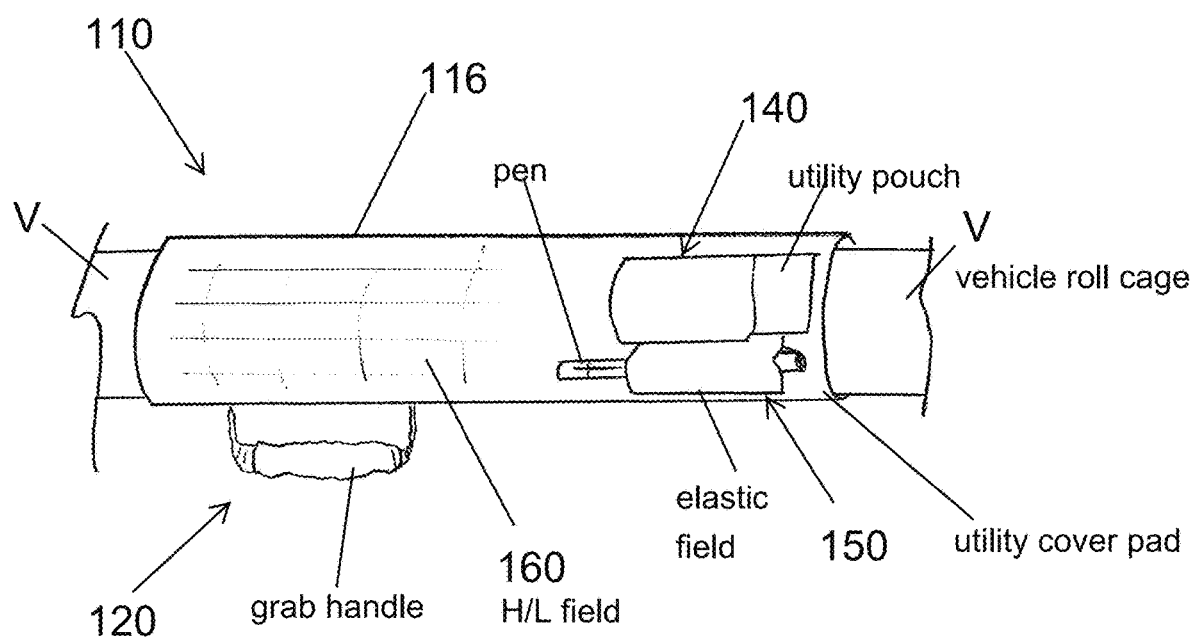
FIG. 3 schematically illustrates a side view of a grab handle assembly according to another embodiment.

FIG. 3 schematically illustrates another embodiment of an assembly 110 configured to be secured to a rollbar or other structure V of a vehicle. As shown, the assembly 110 can comprise a grab handle 120 (e.g., similar to those discussed herein with reference to FIGS. 1 and 2). However, in any of the embodiments disclosed herein, an assembly need not include a grab handle. For example, in some arrangements, an assembly can include one or more other features or components (e.g., utility cover, pouches, elastic fields, etc.), but no grab handles. In other embodiments, as illustrated in FIG. 3, an assembly 110 can include both a grab handle and one or more features or components (e.g., utility cover, pouches, elastic fields, etc.), as desired or required. Further, in any of the embodiments disclosed herein, an assembly can include more than one grab handle (e.g., two, three, etc.) in accordance with a desired or required configuration.

With continued reference to FIG. 3, the depicted assembly 110 comprises a utility cover assembly 116 that wraps around (e.g., partially or completely) the rollbar or other vehicle structure V. As discussed with other arrangements herein, the cover assembly 116 can include hook and loop connectors to easily and reliably secure the cover assembly 116 in place. However, any other type of connector can be used to attach the cover assembly 116 to the rollbar or other internal structure of a vehicle, either in lieu of or in addition to hook and loop connectors.

As illustrated in FIG. 3, a cover assembly 116 can be configured to receive (e.g., removably or permanently) one or more other components, members and/or features. For example, the assembly 110 can comprise one or more of the following that are removably or fixedly secured to the cover assembly 116: a utility pouch 140, an elastic band or field 150, an identification member (e.g., flag, medical identifier, etc.) and/or the like. In the embodiment depicted in FIG. 3, the assembly 110 comprises a utility pouch 140 and an elastic band or field 150. However, in other embodiments, more or fewer (or different) members, components or features can be secured to the cover assembly 116 and/or any other portion of the overall assembly 110, as desired or required.

In any of the embodiments disclosed herein, one or more pouches, bands or fields, other stowage/storage members and/or the like can be configured to be secured directly to a utility cover assembly 116. However, in other embodiments, such members, components and/or other features can be secured to another portion of the assembly. Thus, in some embodiments, utility and/or other pouches, bands or fields, members are not attached to the utility cover assembly.

In any of the embodiments disclosed herein, utility pouches, stowage/storage members and/or other components 150, 160 are configured to removably secure to the outside surface of the utility cover assembly 116. Such members can secure to the cover assembly 116 using one or more attachment devices or methods, such as, for example, hook and loop fasteners, buttons, zippers, other fasteners and/or the like. Thus, such components can be easily and conveniently attached and detached (e.g., for removal, repositioning, etc.) according to the user's preferences and desires. Such configurations apply to all embodiments disclosed herein and equivalents thereof.

The utility cover assembly, the pouches, bands or fields, other stowage/storage members and/other any other portion of the assemblies disclosed herein can comprise one or more durable materials, as desired or required. For example, such components can include one or more flexible, rigid and/or semi-rigid materials, such as, plastics, fabrics, rubber and/or other elastomeric materials, metals or alloys, other natural or synthetic materials and/or the like. In some embodiments, the cover, the grab handle the pouches, stowage/storage members and/or other portions of the assembly comprise nylon fabric (e.g., ballistic nylon fabric) and/or any other type of heavy-duty, durable fabric, as desired or required.

The various pouches, stowage/storage members and the like disclosed herein can be configured to secure one or more different tools or implements. For example, such features or members can be sized, shaped and otherwise adapted to hold flashlights, utility tools, cutting tools, pens and other writing instruments, mobile phones and other devices, wallets and the like. Accordingly, any of the pouches, stowage/storage devices or members and/or the like can include pockets (closeable and open pockets), elastic members, other tool or implement receiving recesses or areas, etc., as desired or required.

Figure 4:
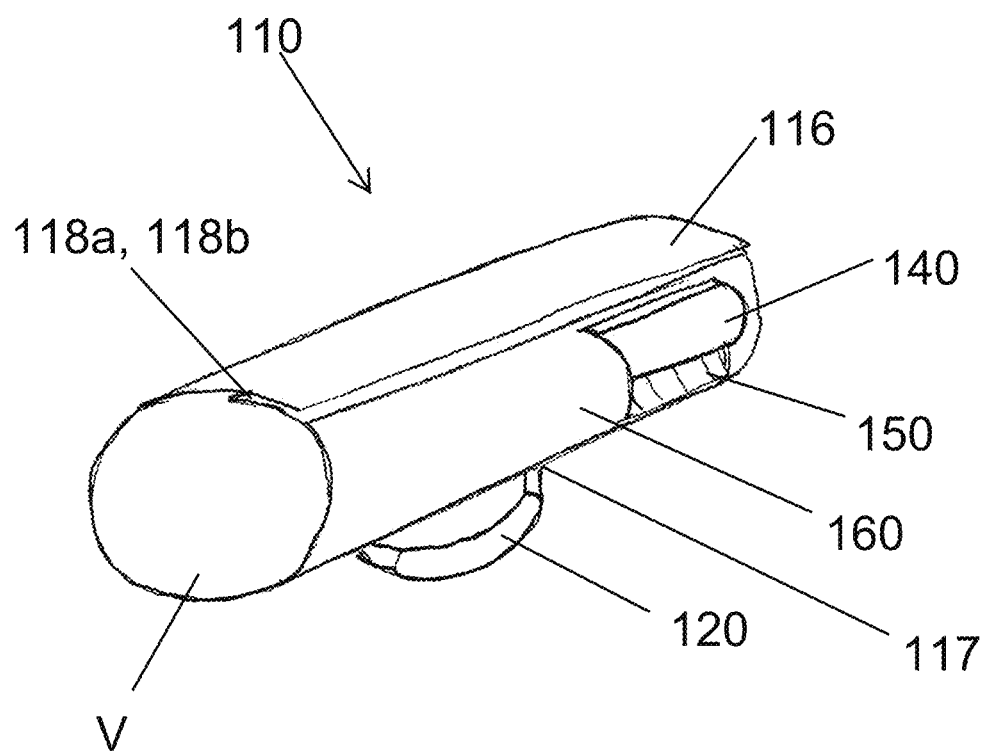
FIG. 4 illustrates a perspective view of a grab handle assembly according to another embodiment FIG. 5 schematically illustrates a side view of a grab handle assembly according to another embodiment.

FIG. 4 illustrates another embodiment of an assembly 110 that is configured to secure to a rollbar or other structure V of a vehicle. Like other assemblies disclosed herein, the assembly 110 comprises a utility cover assembly 116 that wraps around (completely or partially) and secures to the rollbar or other vehicle structure V (e.g., rollbar, roll cage component, etc.). As shown, the assembly 110 comprises a single hand grip assembly 120 that extends downwardly through corresponding openings in the cover assembly 116. In addition, the assembly 110 can include one or more pouches, stowage/storage compartments or features 140, 150 and/or the like. Such members can be removably secure (e.g., using hook and loop fasteners, other fasteners, etc.) to the utility cover assembly 116. In other embodiments, such members can be permanently or semi-permanently secured to the cover assembly 116, as desired or required.

Figure 5:
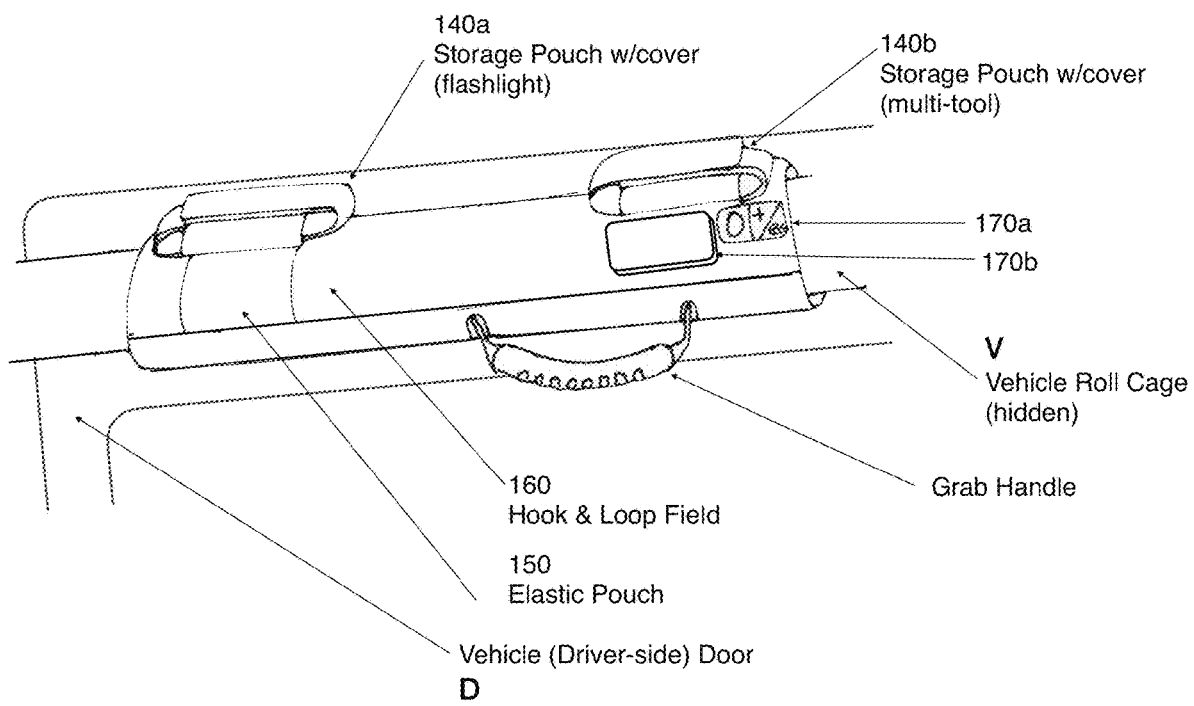
Figure 6:
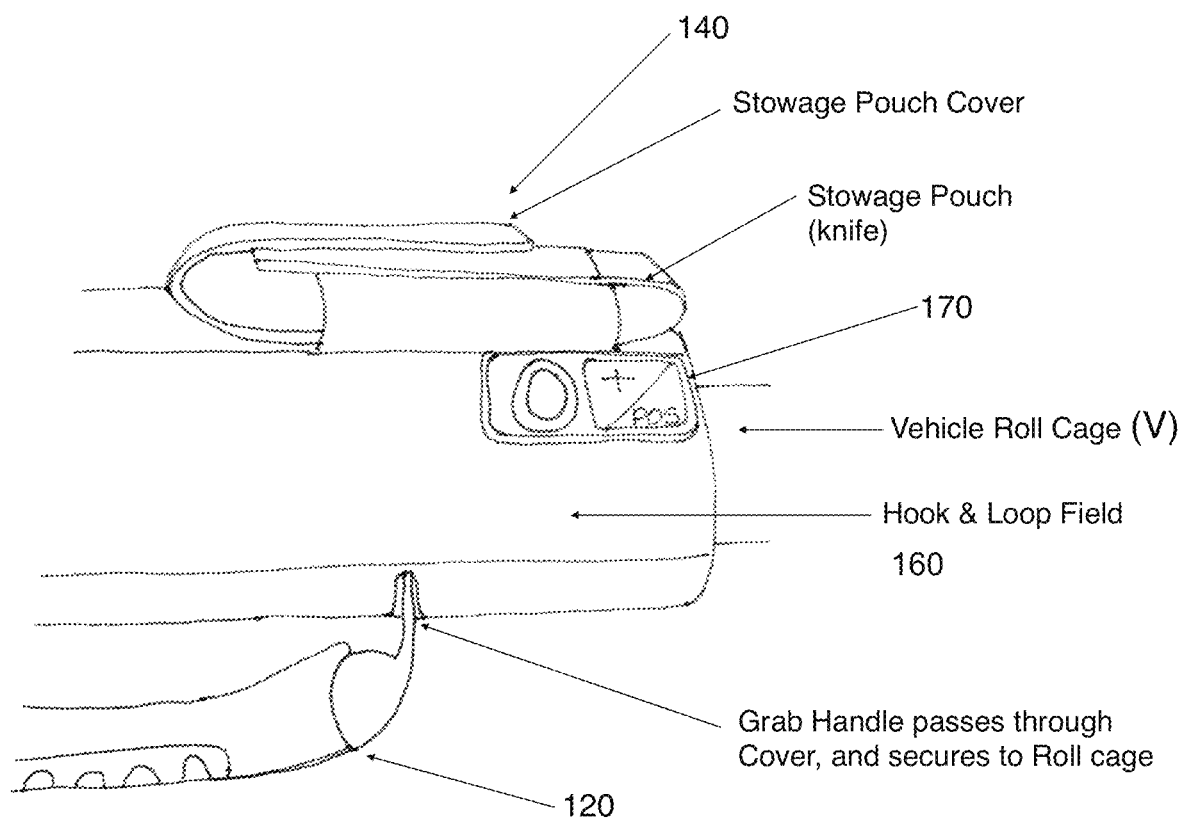
FIG. 6 schematically illustrates a side view of a grab handle assembly according to another embodiment.

As illustrated in FIGS. 5 and 6 and discussed in greater detail herein, the removable hand grip assembly 110 can include one or more hook and loop fields 160 that are configured to receive various pouches, stowage or storage members and other tool or implement receiving members. Further, the hook and loop fields 160 can advantageously provide areas to secure decorative or informative badges or other members. For example, in FIG. 5, the vehicle owner's blood type and a flag 170a, 170b have been secured to the filed 160.

In other embodiments, any of the configurations disclosed herein need not include a cover assembly that extends from one connector to the other. Thus, the cover assembly can be smaller than the configurations illustrated and discussed herein. The function of the cover assembly (e.g., to permit pouches, badges, etc.) to be removably or permanently secured thereto is not altered by such a modified design. Such designs are also covered by this application. It should also be understood that any of the assemblies disclosed herein can include more or fewer connectors to a rollbar or other vehicle structure. For example, an assembly can include 1, 2, 3, 4, 5 or more connectors, as desired or required.

Although several embodiments and examples are disclosed herein, the present application extends beyond the specifically disclosed embodiments to other alternative embodiments and/or uses of the various inventions and modifications, and/or equivalents thereof. It is also contemplated that various combinations or subcombinations of the specific features and aspects of the embodiments may be made and still fall within the scope of the inventions. Accordingly, various features and aspects of the disclosed embodiments can be combined with or substituted for one another in order to form varying modes of the disclosed inventions. Thus, the scope of the various inventions disclosed herein should not be limited by any particular embodiments described above. While the embodiments disclosed herein are susceptible to various modifications, and alternative forms, specific examples thereof have been shown in the drawings and are described in detail herein. However, the inventions of the present application are not limited to the particular forms or methods disclosed, but, to the contrary, cover all modifications, equivalents, and alternatives falling within the spirit and scope of the various embodiments described and the appended claims. Further, the disclosure herein of any particular feature, aspect, method, property, characteristic, quality, attribute, element and/or the like in connection with an implementation or embodiment can be used in all other implementations or embodiments set forth herein.

In any methods disclosed herein, the acts or operations can be performed in any suitable sequence and are not necessarily limited to any particular disclosed sequence and not be performed in the order recited. Various operations can be described as multiple discrete operations in turn, in a manner that can be helpful in understanding certain embodiments; however, the order of description should not be construed to imply that these operations are order dependent. Additionally, any structures described herein can be embodied as integrated components or as separate components. For purposes of comparing various embodiments, certain aspects and advantages of these embodiments are described. Not necessarily all such aspects or advantages are achieved by any particular embodiment. Thus, for example, embodiments can be carried out in a manner that achieves or optimizes one advantage or group of advantages without necessarily achieving other advantages or groups of advantages.

The methods disclosed herein include certain actions taken by a practitioner; however, they can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 mm" includes "1 mm." Phrases preceded by a term such as "substantially" include the recited phrase and should be interpreted based on the circumstances (e.g., as much as reasonably possible under the circumstances). For example, "substantially rigid" includes "rigid," and "substantially parallel" includes "parallel."

What is claimed is:

1. An assembly configured to be removably secured to an exposed structural component of a vehicle, comprising:
a cover assembly configured to secure to the exposed structural component of the vehicle;
a hand grip configured to pass through at least a portion of the cover assembly and hang below the cover assembly, wherein the hand grip is configured to be grasped by a user; and
at least one tool-receiving member configured to secure to the cover assembly;
wherein the cover assembly is configured to at least partially wrap around the exposed structural component and is configured to at least partially shield the hand grip.

2. The assembly of claim 1, wherein the cover assembly comprises a hook and loop portion for securing to the exposed structural component of the vehicle.

3. A system comprising:
a releasably attached grab handle; and
a releasably attached main cover that generally covers an area of the exposed vehicle component that is adjacent to and within reach of an occupant of the vehicle, wherein the main cover comprises at least one opening through which the grab handle passes;
wherein the main cover is configured to at least partially wrap around the exposed vehicle component and is configured to cover at least a portion of the grab handle.

* * * * *